Patented Nov. 4, 1947

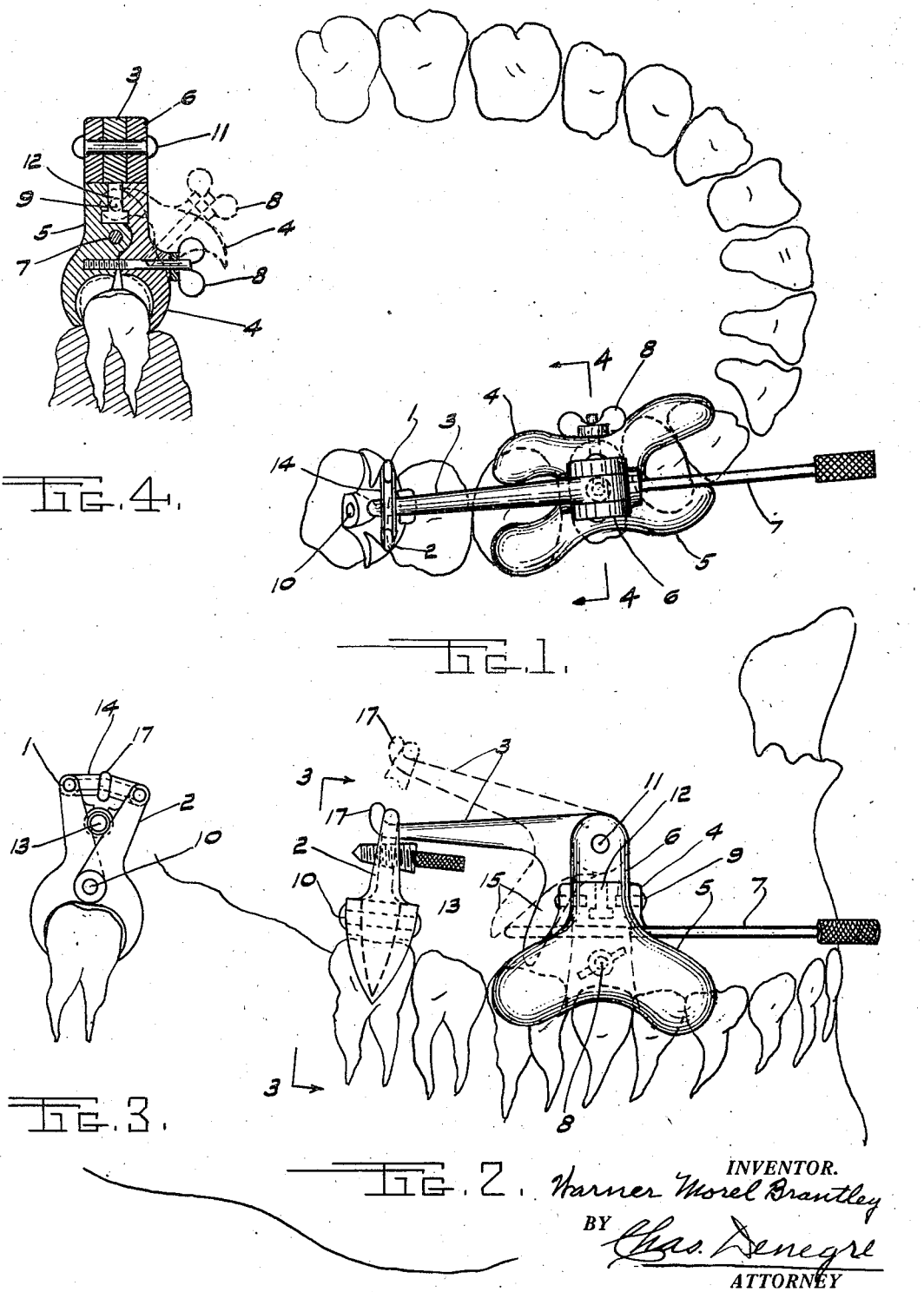

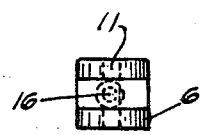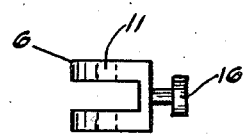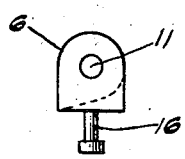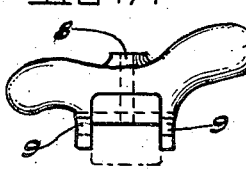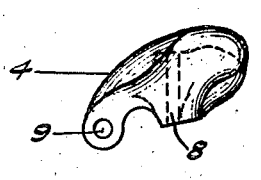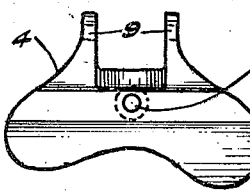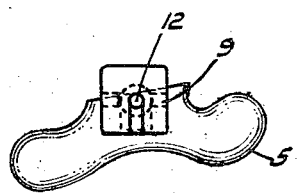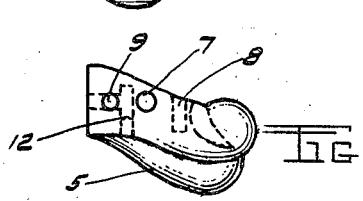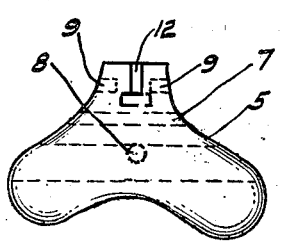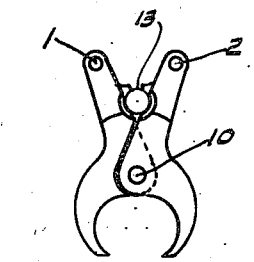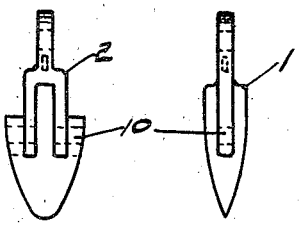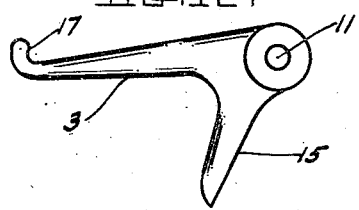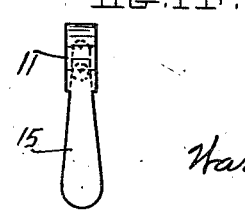

2,430,271

UNITED STATES PATENT OFFICE 2,430,271

TOOTH EXTRACTOR

Warner Morel Brantley, near Birmingham, Ala.

Application August 9, 1946, Serial No. 689,551

1 Claim. (Cl. 32—61)

This invention relates to a tooth extractor for extracting teeth and has for its main objects to provide such a tool that will be highly efficient for its purpose, simple in structure, and a decided improvement over the tools now in general use for pulling teeth.

There has been little improvement for a long time in tools for extracting teeth. Most attention has been given to means for overcoming the pain and suffering caused by the extracting of teeth. The present invention will greatly assist the operator by affording means and force gradually in extracting teeth, especially the rear teeth that are difficult to reach with the present day tools. Other advantages will appear from the drawings and description.

By referring to the drawings, part of this application, it will be observed that Fig. 1 is a general plan view of the tool in place for use adjacent the teeth; Fig. 2 is a side elevational view of Fig. 1 in full lines, with the main lever member in broken lines in a different position; Fig. 3 is a view on line 3—3 of Fig. 2 showing in detail the tooth clamping members of the tool in position on a tooth; Fig. 4 is a cross sectional view on line 4—4 of Fig. 1 showing part of the tool in detail; Fig. 5 is a detail plan view of the swivel or revolving top of the extractor frame; Fig. 6 is a side view of Fig. 5; Fig. 7 is another side view of Fig. 5; Fig. 8 is a plan view of part of the base of the tool; Fig. 9 is a side view of part of the base of the tool; Fig. 10 is an end view of a base part; Fig. 11 is a plan view of an opposite base part; Fig. 12 is a side view of an opposite base part; Fig. 13 is an end view of an opposite base part; Fig. 14 is a detail view of the clamping assembly of the extractor; Fig. 15 is a detail view of part of the clamping assembly; Fig. 16 is a detail view of the opposite part of the clamping assembly; Fig. 17 is a side view of the main lever of the extractor; Fig. 18 is an end view of Fig. 17; Fig. 19 is an end view of Fig. 20; and Fig. 20 is a side view of the tapered thumb screw for use in the tooth clamping arms.

Similar reference numerals refer to similar parts throughout the several views.

Referring to the drawings in detail it will be seen that the device comprises a pair of clamping arms 1 and 2 held together and swingable on a pin shaft 10. A link connection 14 permits limited movement of the tooth contact ends of the clamping arms. The base members 4 and 5 are held together by a wing bolt 8. A recess is formed between the members 4 and 5 adapted for the head 16 to be retained therein by pins 9 in the upper portions of the frame members. This head 16 and its extension shaft 12 are integral with the slot member 6 that revolvably supports the main lever 3 on a pin that passes through the slot member 6. The main lever 3 is provided with an integral extending downward arm 15 adapted to be swung outward from the base assembly by a comparatively long thumb screw 7 that passes through a threaded hole in the base member 5, the hole therein being threaded to accommodate the thumb screw. The end 17 of the lever 3 is adapted to be inserted in the link 14 of the clamping arms 1 and 2. Between the upper portions of the clamping arms 1 and 2 there is a tapered thumb screw 13 adapted to be inserted to hold the pointed ends of the clamps tight against the tooth to be extracted.

From the foregoing it will appear that the tool is a demountable device. In order to use the same the operator first attaches the clamping members 1 and 2 adjacent the tooth to be extracted and tightens the clamps by inserting the tapered thumb screw 13. Then the base members 4 and 5 with other parts in assembled condition are set upon the teeth ahead of the tooth to be extracted, at the same time inserting the lever end 17 in position in the link 14. In this condition the base members form the fulcrum that is held firmly on the teeth ahead. Then the thumb screw 7 is turned and started inward with its end exerting pressure on the lever arm 15 of the main lever thereby producing a pull upward on the end 17 of the lever 3 that is in contact with the link of the clamps 1 and 2 that grip the tooth to be extracted. The tool is adapted to be used on either side of the mouth by reversing the base members. Also the outer ends of the base members may be held down by the operator if necessary to better support the base members as the fulcrum for the main lever 3.

The tool may be made of stainless steel, nickel plated brass, or any other material suitable for the purpose. The invention resides in the structure and combination of parts, not the material of which they are made.

While I have shown and described the preferred embodiment of my invention, I do not wish to limit same to the exact and precise details of structure, but reserve the right to make all modifications and changes so long as they remain within the spirit and scope of the following claim.

Having described my invention I claim:

A tooth extractor of the class described comprising; two members as a main base, a wing bolt adapted to hold the base members together, a revolvable bracket mounted upon the top portions of the base members, a main lever mounted upon a shaft in the bracket, a depending arm integral with the lever, a comparatively long thumb screw inserted through a threaded hole in a base member, one end of the screw adapted to press against and move the depending arm on the main lever when the screw is revolved, the end of the lever adapted to move upward when the long screw exerts pressure against the lever depending arm; a pair of clamps, said clamps held swingably together and mounted upon a shaft, the lower end of each clamp forming a dull point, a collapsing link attached to the other ends of the clamps, a tapered screw positioned between the upper portions of the clamps and adapted to spread the upper portions apart and the pointed ends together; the end of said main lever adapted to hook into the collapsing link attached to the upper ends of the clamps.

WARNER MOREL BRANTLEY.

REFERENCES CITED

The following references are of record in the file of this patent:

UNITED STATES PATENTS

| Number | Name | Date |
|--------|------|------|
| 636,285 | Pinson | Nov. 7, 1899 |